No. 841,409. PATENTED JAN. 15, 1907.
S. LAKE.
OPTICAL INSTRUMENT.
APPLICATION FILED OCT. 5, 1905.

4 SHEETS—SHEET 1.

Witnesses
Inventor
Simon Lake,
By his Attorney

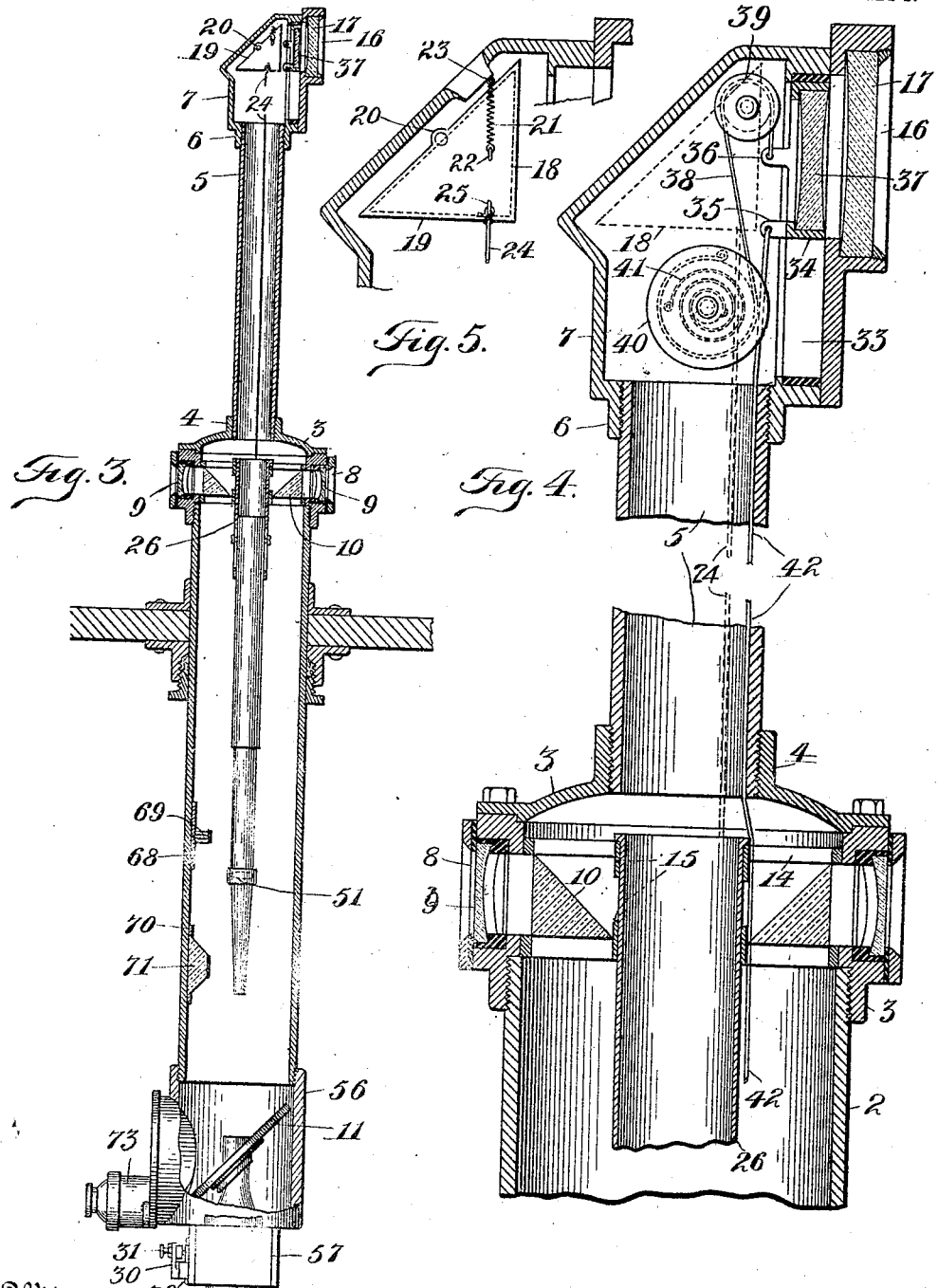

No. 841,409. PATENTED JAN. 15, 1907.
S. LAKE.
OPTICAL INSTRUMENT.
APPLICATION FILED OCT. 5, 1905.

4 SHEETS—SHEET 3.

Witnesses
Inventor
Simon Lake
By his Attorney
Henry J. Miller

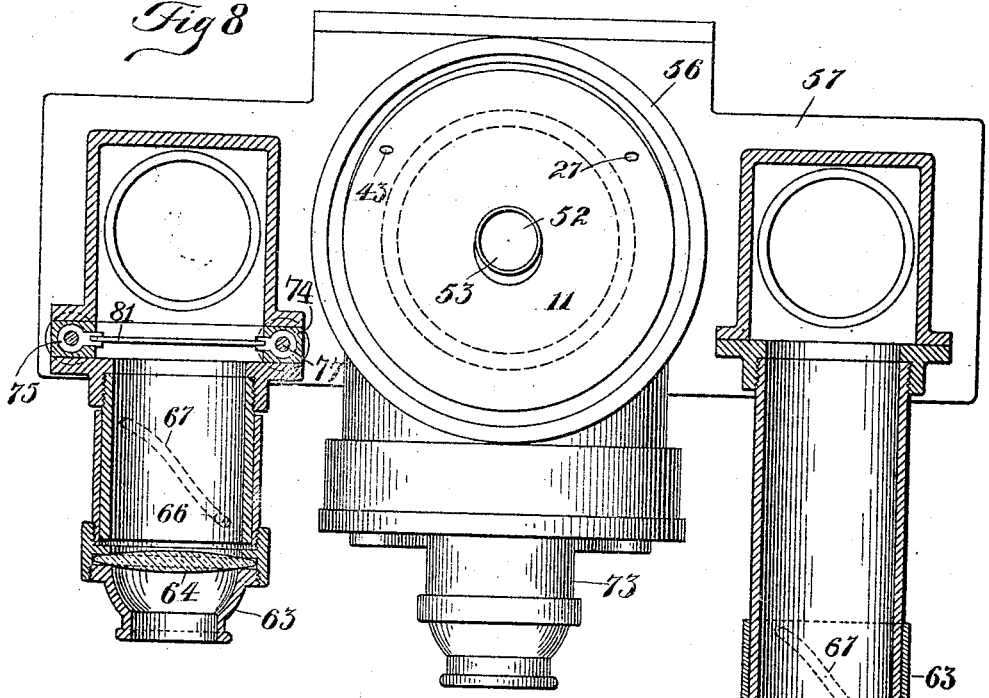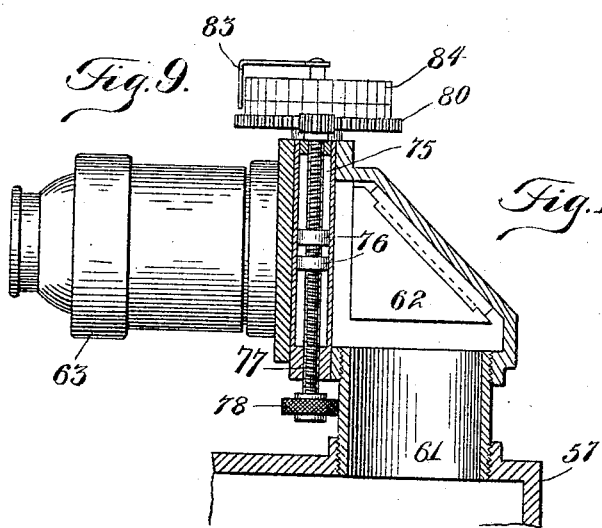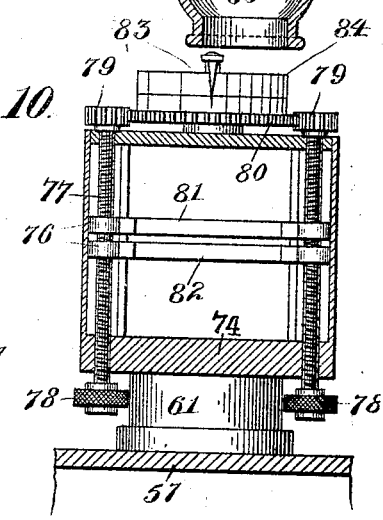

UNITED STATES PATENT OFFICE.

SIMON LAKE, OF BRIDGEPORT, CONNECTICUT.

OPTICAL INSTRUMENT.

No. 841,409.  Specification of Letters Patent.  Patented Jan. 15, 1907.

Application filed October 5, 1905. Serial No. 281,373.

*To all whom it may concern:*

Be it known that I, SIMON LAKE, a citizen of the United States, residing at Bridgeport, in the county of Fairfield and State of Connecticut, have invented certain new and useful Improvements in Optical Instruments, of which the following is a specification, reference being had therein to the accompanying drawings.

This invention relates to an improvement in that class of optical instruments forming the subject of the United States Patent No. 725,570, granted to me April 14, 1903; and it has for its primary object to increase the scope and effectiveness of such class of instruments whereby the latter may be employed in connection with a submarine vessel for readily taking observations throughout the entire horizon, for observing hostile vessels or other objects upon the same scale as they would be seen directly by the observer, or for securing a view of such object upon a greatly-enlarged scale, as by the use of a telescope.

To this end the invention consists in a sighting-tube having its several parts constructed and arranged as represented in the annexed drawings and hereinafter described.

The present improvement is represented in its preferred form in the accompanying drawings, in which—

Figure 1:
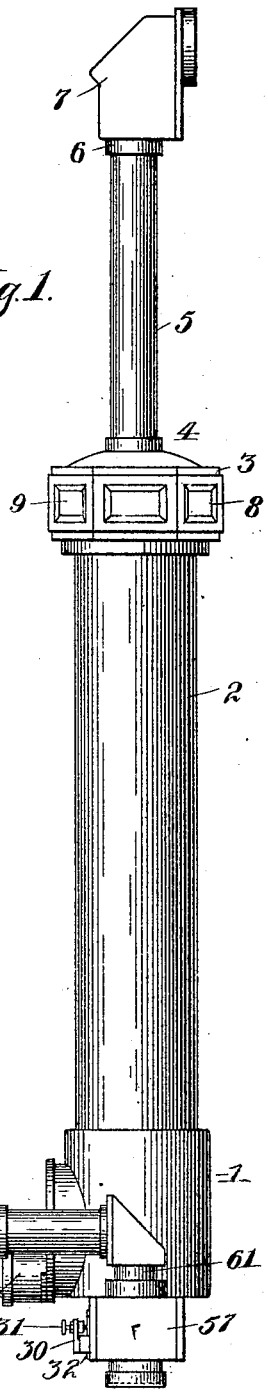
Figure 2:
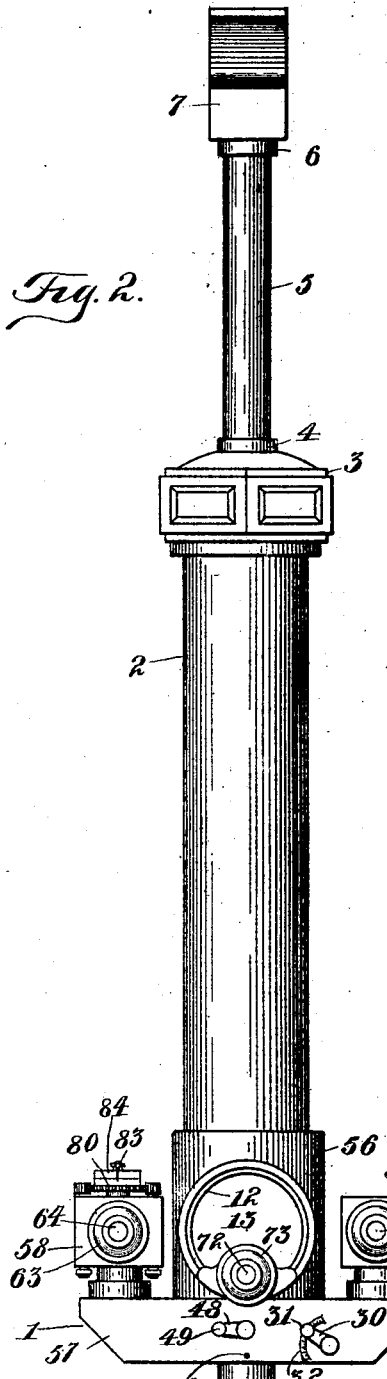
Figure 6:
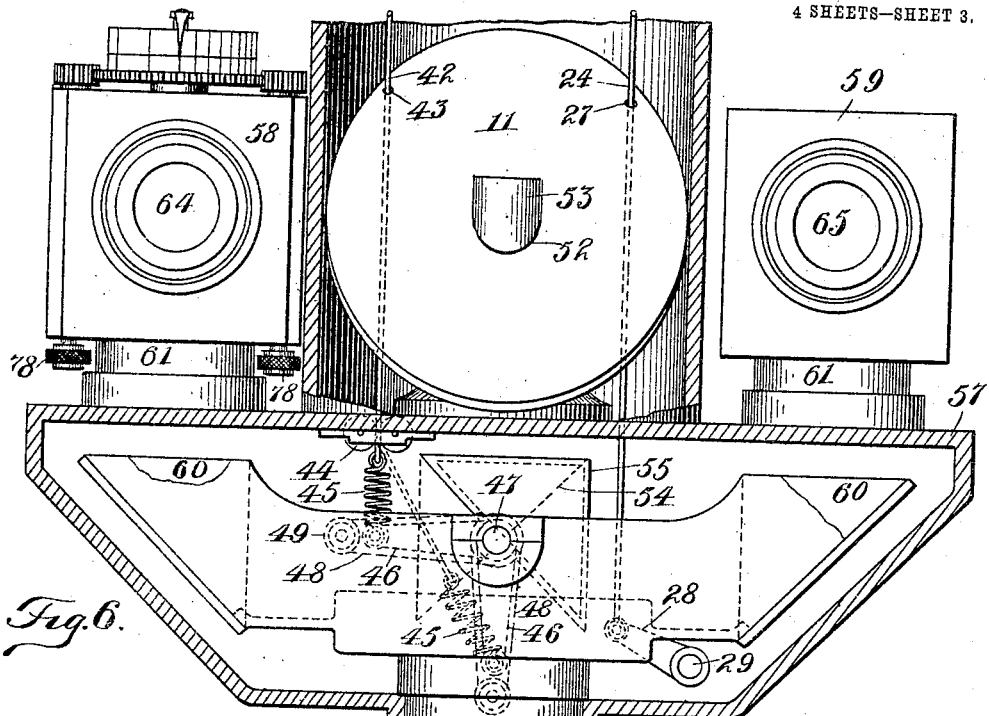
Figure 7:
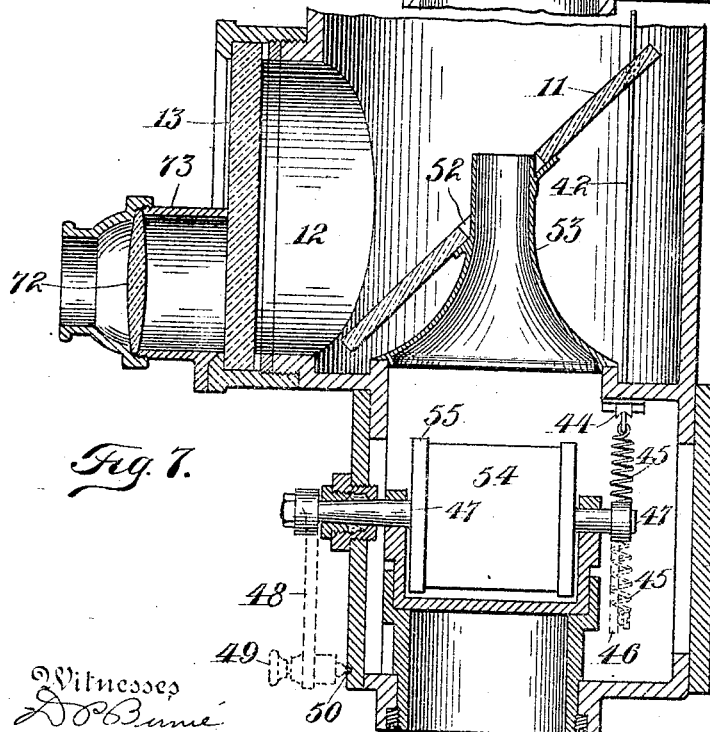

Figure 1 is a side elevation, Fig. 2 a rear elevation, and Fig. 3 a vertical sectional elevation, of the entire instrument. Fig. 4 is an enlarged sectional elevational view of the upper portion of the instrument, with the movable prism indicated only in dotted lines; and Fig. 5, a partial sectional view of the upper hood, showing the movable prism in place. Fig. 6 is an enlarged elevational view, partly in section, of the extreme lower portion of the instrument; Fig. 7, a vertical sectional elevation of the same upon a plane at right angles to that of the preceding figure; and Fig. 8, a plan of the same, partly in horizontal section. Figs. 9 and 10 are respectively sectional elevations in planes at right angles each to the other, representing the measuring device carried by the left-hand eyepiece for determining the distance of an external object of known size from the instrument.

As represented in the drawings, the instrument comprises a lower or base portion 1, provided with several eyepieces, a main tube-section 2, surmounted by a main hood 3, of hexagonal form, provided in its upper end with a perforated boss 4, in which is rigidly secured the lower end of an upper auxiliary tube-section 5, whose upper end is secured in a boss 6, formed upon the bottom of the upper or auxiliary hood 7. The lower hood 3 is shown provided in each of its six lateral faces with a rectangular aperture 8, behind which is arranged a concave object-glass 9, between which and the center of the tube is disposed a prism 10, whose reflecting-face is arranged at a suitable angle to bend the light-rays received through its respective object-glass 9 downwardly in a direction substantially parallel with the principal tube-section 2 upon an inclined speculum 11 or other suitable reflector disposed in the lower or base portion 1 of the instrument, by means of which they are again reflected backwardly through an uncontracted rearward opening 12, which is closed by means of a plain glass disk 13 in any usual or suitable manner, through which latter the images reflected by each of the six prisms or reflectors 10 may be simultaneously observed. The object-glasses 9 may, if desired, each be of such strength as to have a scope of sixty degrees of the horizon; but as the instrument is not only vertically movable through the top of the conning-tower of the submarine-boat to which it is designed to be applied, but has an axial movement therein, the lenses 9 are preferably made of less scope, the entire horizon being covered by a slight rotation of the instrument, the smaller visual angle of these lenses affording a larger view of the respective portions of the horizon embraced within their scope and better adapting them to serve as "finders" for coöperation with the portions of the instrument to be described later.

The hood 3 is provided with a prism-holding frame 14, having an axial tubular portion 15, forming a continuation of the upper tube-section 5, through which may be deflected the light-rays entering the upper hood 7 through its forward lateral opening 16 and plain or slightly-concave glass plate or lens 17 by means of the prism or reflector 18, whose frame 19 is mounted upon pivotal supports 20 within the hood. The prism 18 is maintained yieldingly in one of its extreme inclined positions by means of a spring 21, attached at one end to a hook or pin 22 upon the frame 19 and at the other end to a perforated lug 23 within the hood 7, and is adapted to be tilted upon its bearings 20 in opposition to said spring 21 by means of a cord 24, connected at the upper end with a pin or hook 25 upon the prism-frame 19, passing downwardly along one wall of the tube 5 and through the hollow boss 15 of the prism-frame 14 and thence downwardly along the outside of the depending tubular housing 26 and through a suitable aperture 27 in the speculum 11 to a crank-arm 28 upon the inner end of a spindle 29, having upon its outer end exterior to the base portion 1 a crank-arm 30, whose outer end is provided with a pointer-screw 31, operating in conjunction with the segmental scale 32 to indicate the degree of inclination of the operative face of the prism or reflector 18. The hood 7 is further provided in its forward wall with a vertical slideway 33, in which is fitted the sliding frame 34, provided with the rearwardly-extending perforated lugs 35 and 36 and carrying the double-concave lens 37. The frame 34 is maintained yieldingly in its upper or operative position with the lens 37, interposed between the opening 16 and the reflector 18, by means of a cord 38, connected at one end with the lug 36 and passing over a grooved pulley 39 above the same and thence downward around a similarly-grooved pulley 40, provided with a spiral spring 41 for maintaining the cord 38 taut and holding the lens-frame 34 in elevated operative position. The grooved pulleys 39 and 40 are mounted upon suitable studs upon the one of the side walls of the hood 7. The lens 37 may be drawn out of the range of the reflector 18 by means of a cord 42, attached at one end to the lug 35 upon the lens-frame 34 and passing downwardly through the tube 5 and thence outside of the hollow hub 15, through an aperture 43 in the speculum 11 between the guide-rollers 44, beneath which it terminates in a spring 45, whose lower end is connected with the perforated crank-arm 46 upon the inner end of the spindle 47, having upon its outer end a similar crank-arm 48, carrying at its free end a pointer-screw 49, operating in conjunction with scale-marks 50, one of which is concealed from view by the pointer-screw, as represented in Fig. 2, in indicating the position of the lens 37.

The depending tube or housing 26 is shown provided with a weak convex focusing-lens 51, adapted to receive through the tubes 5 and 26 light-rays received through the laterally-disposed compound or simple objective formed by one or both of the glasses 17 and 37 and direct them through the contracted central opening 52 in the speculum 11 and inverted-funnel-shaped support 53 therefor within the base portion 1 and thence upon the prism or reflector 54, which is mounted in a frame 55, fixed to the inner ends of the spindles 47. By the rigid connection of the prism-frame 55 and the perforated arm 46 it will be observed that both the lens 37 and prism 54 may be changed from one to the other of their extreme positions to establish different conditions in the portions of the instrument affected by them.

The lower portion or base of the instrument comprises the hollow cylindrical hub portion 56, entered by the lower end of the main tube-section 2, and a transverse member 57, of rectangular cross-section, with upwardly-inclined ends upon which are disposed the eyepiece-casings 58 and 59 at the left and right, respectively. Arranged at both ends of the transverse base member 57 are the prisms or reflectors 60, each having its inclined reflecting-face disposed in such manner as to receive light-rays from the prism 54 when in suitable position and bend the same upwardly through an incasing tube 61 upon a similar prism or reflector 62, disposed within its respective eyepiece-casing, the operative face of the reflecting member 62 being disposed suitably to bend the light-rays thus received rearwardly through the tubular portion of the eyepiece and the movable cap 63 thereon carrying the lens 64 and 65, respectively, constituting the eyepiece. The fixed tubular portion of each eyepiece-casing is provided externally with a pin 66, entering a helical guiding-groove 67 in the inner surface of the tubular cap 63, whereby the turning of such cap causes the lens 64 to approach or recede from the reflecting member 62 for the purpose of focusing the same in respect of the other members of the instrument operating in conjunction therewith.

In the position of the parts illustrated in Figs. 3, 4, and 6 the lens 37 is in operative position and the prism 54 is in corresponding position for reflecting light-rays received from the upper hood toward the right for observation through the eyepiece 65, the compound objective 17 37, focusing-lens 51, and eyepiece 65 being of such relative strength as to present to the observer an image of the external object upon the same scale as it would be observed by the natural eye. When the prism 54 is shifted by means of the lever 48 into its other extreme position (indicated in dotted lines in Fig. 6) and the lens 37 is drawn down by the cord 42 into its inoperative position, the prism 54 is transformed into a connecting member between the left-hand eyepiece 64 and the members 51 and 17 of a simple telescope, which produces a greatly-enlarged image of the object observed, but with a reduced visual range.

The eyepieces 64 and 65 are adapted for coöperation with the optical members of the inner tubes 5 and 26 for viewing upon different scales objects ahead of the vessel; but in order to secure a magnified image of an object astern of the vessel the inner wall of the main tube 2 is provided with a frame 68, carrying a weak focusing-lens 69, disposed directly within the range of the rearward reflecting-prism 10, and between which and the lower portion of the speculum 11 is disposed a second frame 70, also secured to the inner wall of the tube 2 and carrying a double reflecting-prism 71, of trapezoidal form, with its inclined operative faces so disposed that the light-rays from the lens 69 pass through both before striking the speculum 11. Disposed within the range of the members 68, 71, and 11 is an eyepiece 72, disposed within a casing 73, through which the observer may secure a view upon an enlarged scale of the object seen upon a reduced scale through the opening 12 and the rearward opening 8 of the hood 3. Interposed between the portions of the eyepiece 64 is disposed a thin rectangular frame 74, having a central aperture registering with the inner wall of the eyepiece-frame and provided upon opposite sides with guideways 75, to which are fitted two pairs of internally-threaded blocks 76, whose right and left threaded apertures are fitted to the similarly-threaded screws 77, mounted in suitable bearings upon the frame and each provided at one end with a milled wheel 78 for turning it and at the opposite end with a gear-wheel 79, meshing with an intermediate gear-wheel 80. The corresponding blocks fitted to the two screws 74 each receive the end of a glass gage-bar 81 82, the distance apart of whose edges is varied by turning the screws 74, whose connection by the intermeshing gears 79 and 80 causes them to turn correspondingly and maintain the parallelism of the gage-bars in their recession from and approach toward each other in performing their normal function.

As is well known, the commanders of naval vessels are provided with minute information as to the dimensions and other characteristic features of all war vessels. The distance-measuring device of the present invention is therefore designed to register the distance of a vessel from the instrument by measurement of the height of some prominent portion of such vessel or that of a man upon the same, if not too far distant, by the employment of a suitable scale graduated by actual experiment to indicate distances at which common objects of substantially uniform height assume certain given dimensions. To this end the bars 81 and 82 are preferably made of such width that for a given standard of distance—as, for instance, one thousand yards—and at a unit of distance apart of the gage-bars a smoke-stack sixty feet high would be embraced between the outer edges of the gage-bars, while a man six feet tall would be embraced between the inner edges of such gage-bars.

As indicated in Figs. 8, 9, and 10, the frame 74 carries a stationary pointer 83, showing a reading of "1" and "10," respectively, upon the upper and lower peripheral scales carried by the drum 84, rigidly connected with the gear-wheel 80 to indicate the comparative heights of the two objects at the initial distance from the instrument. The graduations of both scales having been applied by actual trial, all variations in the distances of the corresponding portions of the gage-bars will have corresponding distances in the scales, so that it will be found that the distance of a hostile vessel from that provided with the instrument will be sufficiently determinable for the practical purposes of discharging torpedoes. It is evident that by varying the inclination of the upper prism 18 by means of the crank 30 the image of any object to be measured can be brought into register with the space intermediate the corresponding edges of the gage-bars, so as to insure accuracy in the measurement.

From the foregoing description it will be seen that the present invention is susceptible of material variation in the form and arrangement of the several parts and that it is not, therefore, to be understood as limited to the details of construction and arrangement herein shown and described. The members 17 and 37 are herein described collectively as a "compound objective;" but it is evident that the function of such objective will remain substantially the same in character whether the lens or plate 17 has an appreciable curvature, as represented in the drawings, or its curvature be decreased to such extent as to constitute it substantially or actually a plane glass disk for the mere closing of the aperture 16.

I have not claimed herein certain of the features of construction and arrangement of the several parts of the instrument described in the foregoing specification and represented in the drawings, as the same are of the joint invention of myself with Edward L. Hubbard, for which I have this day executed a joint application for Letters Patent of the United States; but I wish it to be understood that all the novel features shown and described in the present application, excepting those described and claimed in the said joint application, are of my invention.

Having thus set forth the invention, I claim—

1. In an optical instrument, the combination with a tubular casing carrying at one end an inclined reflector for receiving laterally an image of an external object and reflecting it longitudinally through said casing, of an objective comprising a member movable into and out of the visual range of said reflector, and means controlled exteriorly at the end of said casing opposite that carrying said reflector for shifting the movable member of said objective into and out of the visual range of said reflector.

2. In an optical instrument, the combination with a tubular casing carrying an inclined reflector for receiving laterally an image of an external object and reflecting it downwardly through said casing, independent magnifying members for producing images of said object upon different scales, and a common movable reflecting member in the visual range of said inclined reflector and adapted to bend the light-rays therefrom to either of said magnifying members.

3. In an optical instrument, the combination with a tubular casing provided at its lower end with an unobstructed lateral opening, of a plurality of divergently-inclined reflectors disposed at the upper end of said casing for receiving laterally images of differently-disposed external objects and reflecting them downwardly through the same, and an inclined reflector disposed in line with said lateral opening of the casing and adapted to direct through the same simultaneously images received through all of said divergently-inclined reflectors.

4. In an optical instrument, the combination with a tubular casing provided at its lower end with an unobstructed lateral opening, of a plurality of divergently-inclined reflectors disposed at the upper end of said casing for receiving laterally images of differently-disposed external objects and reflecting them downwardly through the same, an inclined reflector disposed in line with said lateral opening of the casing and adapted to direct through the same simultaneously images received through all of said divergently-inclined reflectors, an eyepiece directed into said lateral opening of the casing near its periphery, and a focusing-lens interposed between and in the visual range of the said eyepiece and adjacent reflector and one of the said divergently-disposed inclined reflectors.

5. In an optical instrument, the combination with a tubular casing provided at its lower end with an unobstructed lateral opening, of a plurality of divergently-inclined reflectors disposed at the upper end of said casing for receiving laterally images of differently-disposed external objects and reflecting them downwardly through the same, an inclined reflector disposed in line with said lateral opening of the casing and adapted to direct through the same simultaneously images received through all of said divergently-inclined reflectors, an eyepiece directed into said lateral opening of the casing near its periphery, and a focusing-lens and a double-reversing prism interposed between and in the visual range of the said eyepiece and adjacent reflector and one of the said divergently-disposed inclined reflectors.

6. An optical instrument comprising a casing, an eyepiece and means coöperating therewith within said casing for transmitting through the same an image of an object of known dimension, a pair of gage members interposed in the visual range of said eyepiece, shifting means for producing the relative movement of said gage members toward and from each other and in respect of the optical axis of the instrument, means movable in respect of said casing whereby said gage members may be trained upon the object, and a scale connected and movable proportionally with said shifting means whereby the measure of said object at a distance from said instrument will afford a basis of computation of such distance.

7. The combination with a rigid support, of an optical instrument constructed with a tubular casing mounted within said support and sustained in fixed angular relation therewith, said instrument comprising an eyepiece and means coöperating therewith for transmitting through the same an image of an object of known dimension, a pair of gage members interposed in the visual range of said eyepiece, shifting means for producing the relative movement of said gage members toward and from each other and in respect of the optical axis of the instrument, means independent of said fixed support whereby said gage members may be trained upon the object, and a scale connected and movable proportionally with said shifting means whereby the measure of said object at a distance from said instrument will afford a basis of computation of such distance.

8. In an optical instrument, the combination with a tubular casing, an objective comprising fixed and movable members of which the latter is adapted to be shifted transversely out of range of the former, and an inclined reflector in the visual range of the fixed member of the objective and adapted to receive laterally an image of an external object and reflect it longitudinally through said casing, of independent means within said casing coöperating respectively with both and with one only of the component members of said objective whereby differently-magnified images of the same object may be produced.

9. In an optical instrument, the combination with a casing, a plurality of similarly-directed inclined reflectors each adapted to receive laterally an image of the same external object and reflect it longitudinally of said casing, and an objective in the visual range of each of said reflectors, of means, also within the visual range of one of said reflectors, for producing differently-magnified images of said object through the same objective simultaneously with the production of a reduced image through the other of said objectives.

10. In an optical instrument, the combination with a tubular casing carrying at one end a reflector for receiving laterally an image and reflecting it longitudinally through said casing, and two independent receiving-lenses or eyepieces disposed at the opposite end of said casing, of means whereby an image from the common reflector may be directed to either of said receiving-lenses or eyepieces.

11. In an optical instrument, the combination with a tubular casing carrying at one end a reflector for receiving laterally an image and reflecting it longitudinally through said casing, and two independent receiving-lenses or eyepieces of different powers disposed at the opposite end of said casing, of an objective comprising a member movable into and out of the visual range of said reflector, and means whereby the image from the common reflector may be directed to one of said receiving-lenses or eyepieces when the movable member of said objective is in operative position and may be directed to the other when said movable member of the objective is in inoperative position.

In testimony whereof I have signed my name to this specification in the presence of two subscribing witnesses.

SIMON LAKE.

Witnesses:
J. C. LAKE,
H. J. MILLER.